United States Patent [19]

Bingham et al.

[11] Patent Number: 5,087,412
[45] Date of Patent: Feb. 11, 1992

[54] NUCLEAR REACTOR

[75] Inventors: Billy E. Bingham; John R. Coiner, Jr., both of Lynchburg; William G. Pettus, Monroe; Barrett J. Short, Lynchburg, all of Va.

[73] Assignee: The Babcock & Wilcox Company, New Orleans, La.

[21] Appl. No.: 407,515

[22] Filed: Sep. 15, 1989

[51] Int. Cl.⁵ .............................. G21C 15/00
[52] U.S. Cl. ........................ 376/368; 376/318; 376/319; 376/356; 376/366; 376/454; 376/391
[58] Field of Search ............ 376/368, 356, 454, 318, 376/319, 301, 366

[56] References Cited

U.S. PATENT DOCUMENTS

| | | | |
|---|---|---|---|
| 2,868,708 | 11/1959 | Vernon | 204/193.2 |
| 2,977,297 | 3/1961 | Evans et al. | 204/193.2 |
| 3,047,479 | 9/1962 | Young et al. | 204/154.2 |
| 3,071,527 | 1/1963 | Young | 204/193.2 |
| 3,090,743 | 5/1963 | Alfille | 204/193.2 |
| 3,108,053 | 10/1963 | Vrillon et al. | 204/193.2 |
| 3,180,801 | 4/1965 | Rickert et al. | 176/51 |
| 3,190,807 | 6/1965 | Bevilacqua | 176/59 |
| 3,249,506 | 5/1966 | Tower et al. | 176/55 |
| 3,266,999 | 8/1966 | Wood et al. | 176/58 |
| 3,309,280 | 3/1967 | Balog | 176/61 |
| 3,383,858 | 5/1968 | Willinski et al. | 60/203 |
| 3,509,023 | 4/1970 | Williams | 176/52 |
| 3,793,832 | 2/1974 | Moon | 60/203 |

Primary Examiner—Robert L. Stoll
Assistant Examiner—Nina Bhat
Attorney, Agent, or Firm—Robert J. Edwards; D. Neil LaHaye

[57] ABSTRACT

A nuclear reactor using gas as a primary coolant and a liquid as a moderator and/or reflector. Gas coolant flows through inlet passages around the outlet plenum to a distributor plate. The gas is directed between fuel element housing thimbles and fuel elements therein, through the fuel elements, and into the reactor outlet plenum. Fins on the thimble housings conduct heat to the gas from a liquid moderator circulating in the core. The use of a liquid moderator enhances safety, allows the fissile material and reactor mass to be reduced and eliminates problems associated with cooling of a solid moderator.

5 Claims, 4 Drawing Sheets

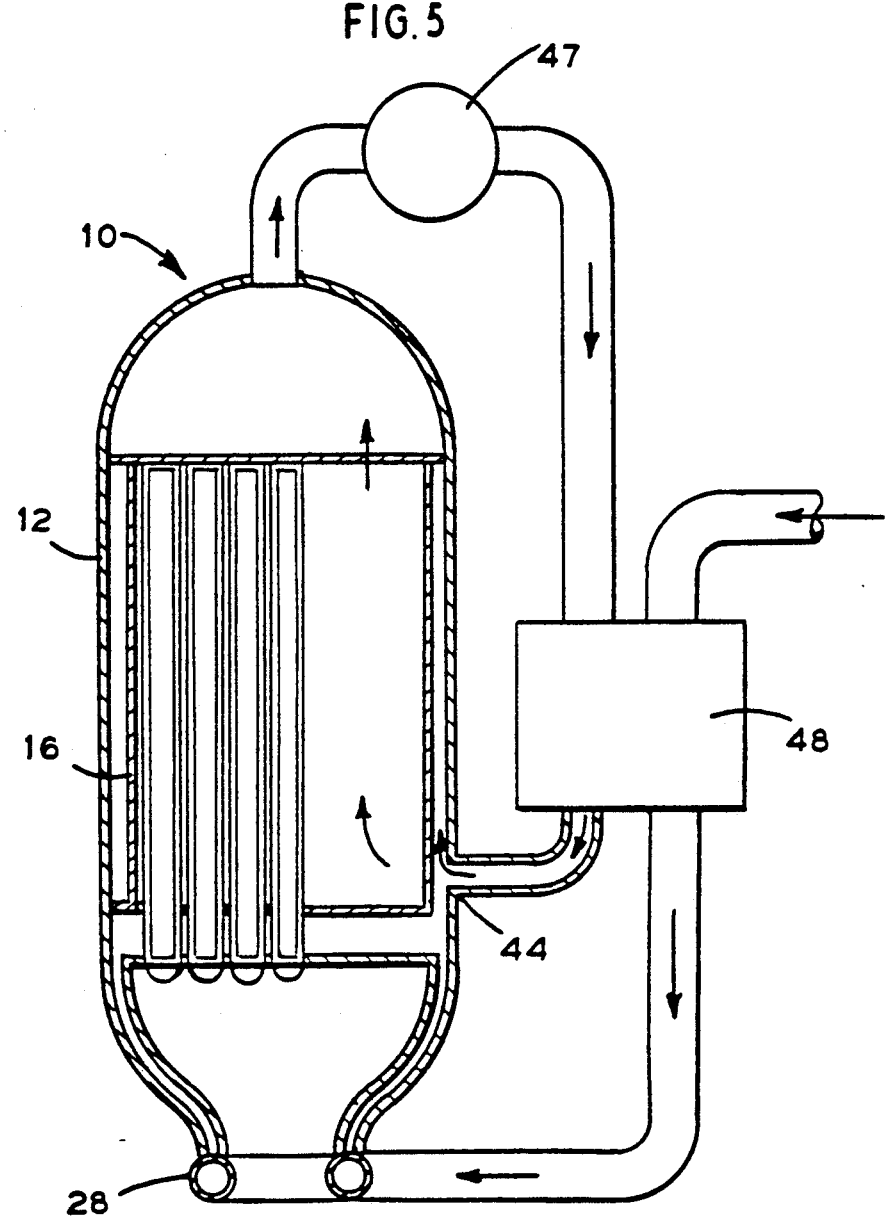

NUCLEAR REACTOR

BACKGROUND OF THE INVENTION

1. Field of the Invention

The invention is generally related to nuclear reactors and in particular to thermal power reactors for use in outer space.

2. General Background

Nuclear reactors designed for use in outer space may be classified according to the energy distribution of the neutrons in the core. This energy distribution can be tailored according to the amount and type of moderator (material that reduces the energy level of neutrons) and reflector (material that returns or reflects neutrons to the core region) used in and around the core. The following three classifications are generally used.

First, a fast reactor is one in which little or no moderator is used and the average neutron energy is close to that at which the fission neutrons are born. The first successful space reactor, SNAP-8, and the SP-100 currently under development are examples of this type. These are usually liquid metal cooled reactors and are characterized by relatively high specific fuel mass (Kg/Kw).

Second, an intermediate reactor is one in which the average neutron energy at which fission occurs is in the range from a few electron volts (ev) to a few thousand electron volts (Kev). An example of this is the NERVA—type propulsion reactor which is moderated partly by the graphite matrix of the fuel elements and partly by separate columns of zirconium hydride. These reactors are intended for short term operation at very high power and are relatively massive compared to more recent conceptual designs.

Third, a thermal reactor is one in which the average neutron energy at which fission occurs is less than one electron volt. At this energy level, the fission cross sections of the important fissile materials become very large and the fissile loading is reduced relative to that required in the first two reactor types. Because of the large fission cross sections thermal reactors require substantial quantities of an efficient moderator between and around the fuel elements. The relatively small amount of fissile material required in a thermal reactor provides important advantages over fast and intermediate reactors.

A number of missions in outer space are not presently feasible because of the mass of the propulsion system and/or the on-board power system. In the case of a nuclear system with a solid moderator and high power density, adequate cooling of the moderator imposes a severe mass penalty. Compliance with safety requirements also imposes additional mass penalties. A further problem limiting some missions is degradation of the reactor moderator caused by radiation damage. It can be seen from the above that a need exists for reactors used in space applications with enhanced safety, low specific mass, and capability of extended high power operation without radiation damage to the moderator.

SUMMARY OF THE INVENTION

The present invention solves the above problems in the form of a liquid moderated and/or reflected reactor. In a gas-cooled nuclear reactor, the fuel elements are surrounded by a liquid moderator which shifts the neutron energy spectrum into a range of high fission probability. This permits a sustained chain reaction and power production with minimum reactor fuel and mass. Heat removal from the moderator/reflector is accomplished by forced circulation of the liquid moderator/reflector over an array of heat conducting fins projecting into the liquid from the fuel element housing thimbles. The heat from the liquid is conducted through the fins to the cooler reactor coolant gas on the inside of the thimbles whereas in conventional pressurized water reactors the heat flow is into the liquid rather than from the liquid. Unlike conventional water moderated reactors, the liquid moderator/reflector is not utilized in the energy conversion process.

BRIEF DESCRIPTION OF THE DRAWINGS

For a further understanding of the nature and objects of the present invention reference should be had to the following description, taken in conjunction with the accompanying drawings, in which like parts are given like reference numerals and, wherein:

FIG. 5 illustrates an alternate embodiment of the invention.

DETAILED DESCRIPTION OF THE PREFERRED EMBODIMENT

Figure 2:
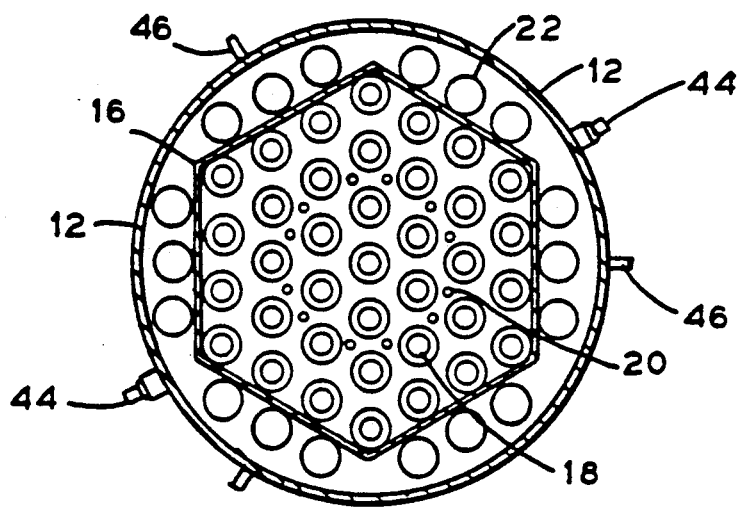
FIG. 2 is a cross sectional view at the midplane of FIG. 1.

Referring to the drawings, it is seen that the invention is generally referred to by the numeral 10. Nuclear reactor 10 is formed from reactor vessel 12 having primary coolant outlet plenum 14, core barrel 16, fuel elements 18, safety rods 20, and control drums 22. Drives 24 are also provided for safety rods 20 and control drums 22. Instrumentation and power leads enter reactor 10 through head penetration nozzle 26. Nuclear reactor 10 is essentially a conventional nuclear reactor relative to the use of a reactor vessel, fuel elements, safety rods, and control drums with improvements directed toward nuclear reactors intended for applications in outer space.

Primary coolant inlet passage 28 is provided on the outer wall of primary coolant outlet plenum 14. As seen in the detail view of FIG. 4A, passage 28 is of a general torus or semicircular shape in the preferred embodiment. As best seen in FIG. 4 and the detail view of FIG. 4B, inlet passage 28 directs the primary coolant to inlet plenum 30 adjacent to distributor plate 32. During auxiliary heat removal gaseous coolant flows into plenum 28 through nozzles 46.

Figure 1:
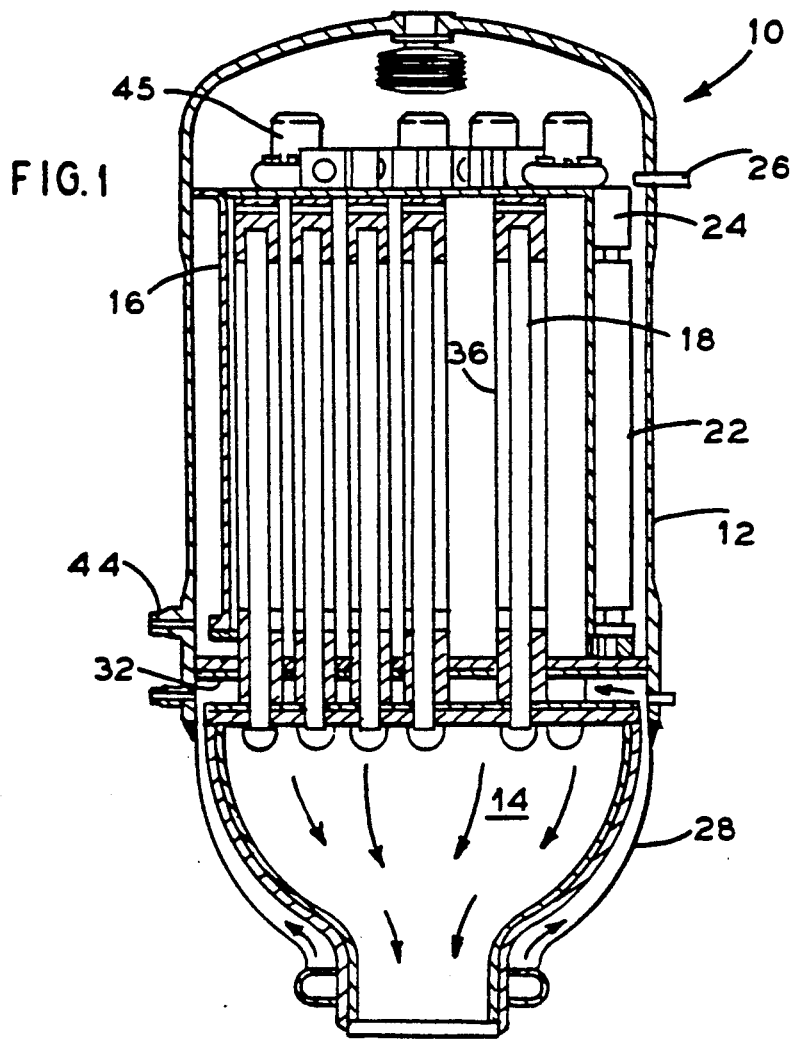
FIG. 1 is a side sectional view of a nuclear reactor illustrating the gaseous coolant flow according to the invention.
Figure 3:
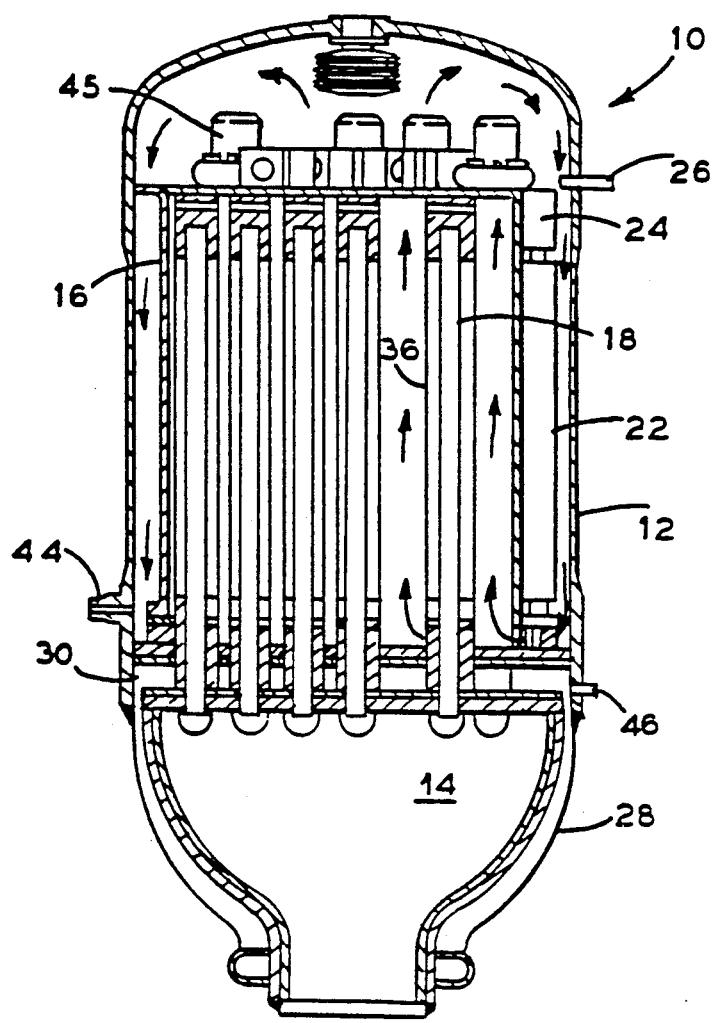
FIG. 3 is a side sectional view of a nuclear reactor illustrating moderator/reflector flow according to the invention.
Figure 4B:
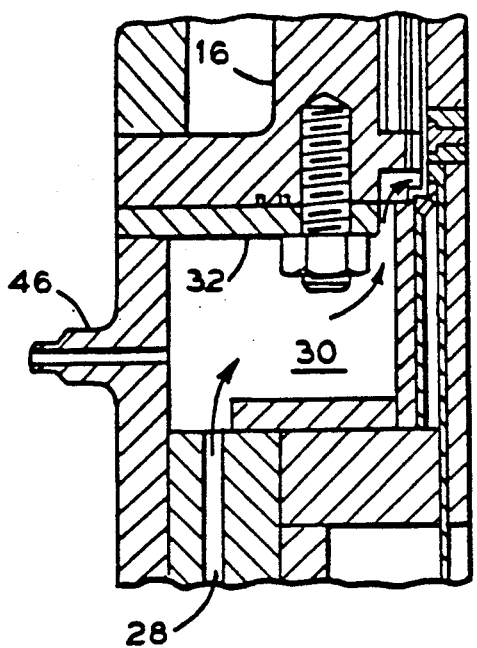
FIG. 4A-C are detail views illustrating the flow path of the gaseous coolant.
Figure 4:
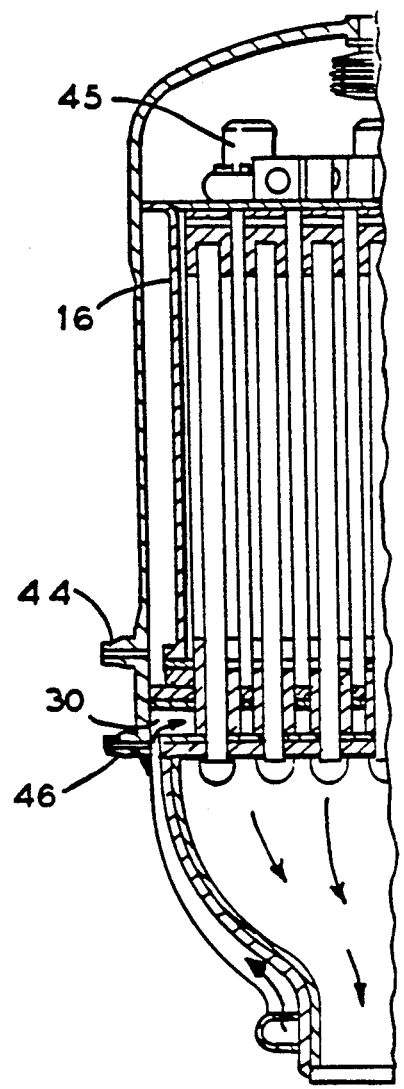
FIG. 4 is a partial side sectional view of a nuclear reactor according to the invention.
Figure 4C:
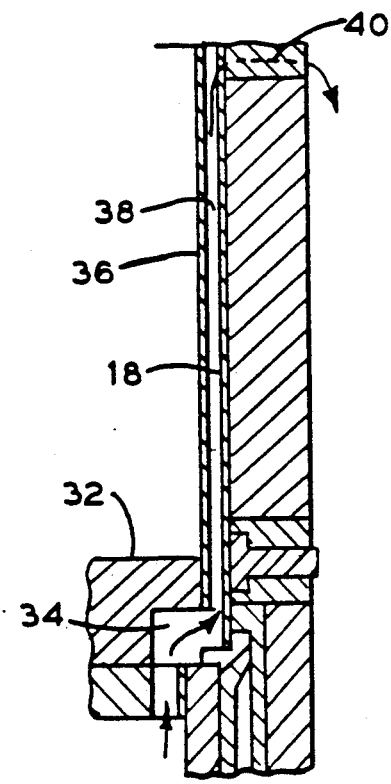
Figure 4A:
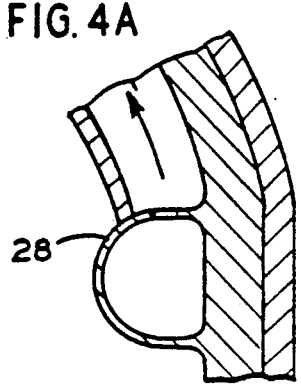

As seen in FIG. 1 and 4B, distributor plate 32 is bolted to core barrel 16 and extends across the lower portion of reactor vessel 12 above primary coolant outlet plenum 14. As best seen in the detail views of FIG. 4B and 4C, distributor plate 32 is provided with passageways 34 which direct the primary coolant to a gap 38 between each fuel element housing thimble 36 and the fuel element 18 it surrounds. As seen in FIG. 4C, fuel element housing thimbles 36 and fuel elements 18 are mounted in distributor plate 32 to form gap 38. Fuel elements 18 also extend below distributor plate 32 into primary coolant outlet plenum 14 as seen in FIG. 1, 3, and 4 so that the interior of each fuel element 18 is in fluid communication therewith. The primary coolant flows from gap 38 through porous material 40 as indicated by the arrow in FIG. 4C into center 42 of fuel element 18 and then flows downwardly through fuel element 18 into primary coolant outlet plenum 14.

Figure 3A:
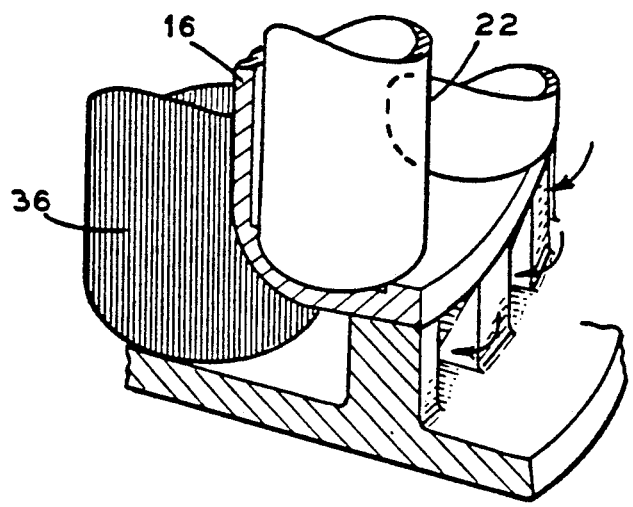
FIG. 3A is a detail view illustrating a finned fuel element housing thimble and the return flow path from the reflector to the moderator region of the reactor core.

Reactor vessel 12 is provided with nozzles 44 used to insert or drain liquid from the reactor core. During reactor operation the liquid is circulated up through the moderator region bounded by the inside of core barrel 16 and the outside of fuel element housing thimbles 36. As seen in FIG. 3 and indicated by arrows, the liquid then enters circulation pumps 45, is discharged by the pumps into the upper head, and then flows down around and through the control drums 22 in the reflector region bounded by the reactor vessel 12 and the core barrel 16. As seen in FIG. 3A, and indicated by arrows, the liquid then completes its circulation loop by flowing into the moderator region through the passages provided in core barrel 16 at the lower end.

As seen in FIG. 3A, fuel element housing thimbles 36 are provided with fins which extend from the thimble outer circumference into the liquid and which serve to conduct heat from the liquid to the primary gaseous coolant flowing inside the thimbles 36. This is accomplished by using a primary coolant that is at a temperature cooler than the liquid moderator when the coolant enters annular gap 38. The primary coolant (cold relative to the moderator) is heated by conduction/convection from the warmer liquid moderator through housing thimble 36. The moderator is heated by absorbed radiation to a dynamic equilibrium temperature higher than that of the coolant. Direct heating of the primary coolant by the fuel elements does not occur until radial passage of the coolant through porous material 40. In conventional terrestrial water moderator reactors, for useful energy production the heat flow is into the liquid moderator at the fuel elements rather than from the liquid as in the reactor of the invention.

The liquid moderator/reflector is not in place during manufacture, ground transportation, launch, and disposal, thus enhancing reactor safety since the reactor is kept subcritical. When operation begins, the liquid moderator/reflector is added to reactor vessel 12 through fill/drain nozzles 44 for circulation in the core as described above. The liquid moderator/reflector enables the relatively small amount of fissile material in fuel elements 18 to go critical (become a self-sustaining reaction) in the core and cools the control drums and other system components.

In the preferred embodiment, the primary coolant is a gas suitable for such use and the liquid moderator/reflector is water. A gas coolant that is in a cryogenic state, such as hydrogen at minus 400 degrees F., when it enters the inlet of gap 38 is well suited to the heat transfer process of the invention. Other suitable liquid moderator/reflector such as various organic liquids may also be used.

An alternative to the preferred approach is shown in FIG. 5 wherein a heat exchanger external to the reactor is provided for supplemental heat removal from the liquid moderator. The liquid moderator circulates through the core from the bottom fill nozzles up through the moderator and reflector regions and into the upper head. From the upper reactor head the liquid exits the core, passes through pump 47, and flows into heat exchanger 48 where it is cooled by the coolant gas before the gas enters the reactor. The liquid moderator then flows from the heat exchanger into the core through the fill/drain nozzles 44. Cooling of the liquid moderator is provided in the core as described in the preferred approach.

What is claimed as invention is:

1. A nuclear reactor including a reactor vessel having a core barrel inside the reactor vessel, fuel elements and safety rods inside the core barrel, a fuel element housing thimble surrounding each fuel element and defining a gap therebetween, and a primary coolant flow path that includes flow through the fuel element housing thimble gaps, wherein the improvement comprises:
   a. means for circulating a liquid moderator through the core barrel around the fuel element housing thimbles;
   b. said primary coolant being at a cooler temperature than said liquid moderator when entering said fuel element housing thimble gaps; and
   c. fins on the fuel element housing thimbles for conducting heat from the liquid moderator to the primary coolant flowing through said fuel element housing thimble gaps.

2. The nuclear reactor of claim 1, wherein the primary coolant is a gas.

3. The nuclear reactor of claim 1, wherein said means for circulating a liquid moderator comprises pumps and fill and drain nozzles on the reactor vessel.

4. A gas cooled nuclear reactor including a reactor vessel having a core barrel inside the reactor vessel, fuel elements and safety rods inside the core barrel, a fuel element housing thimble surrounding each fuel element and defining a gap therebetween, and a primary coolant flow path that includes flow through the fuel element housing thimble gaps, wherein the improvement comprises:
   a. means for circulating a liquid moderator through the core barrel around the fuel element housing thimbles,
   b. said primary coolant being at a cooler temperature than said liquid moderator when entering said fuel element housing thimble gaps; and
   c. finds on the fuel element housing thimbles for conducting heat from the liquid moderator to the primary gas coolant flowing through said fuel element housing thimble gaps.

5. The nuclear reactor of claim 4, further comprising a supplemental heat exchanger external to the reactor in fluid communication with the liquid moderator and primary coolant of the reactor for conducting heat from the liquid moderator to the primary coolant.

* * * * *